No. 748,611. Patented January 5, 1904.

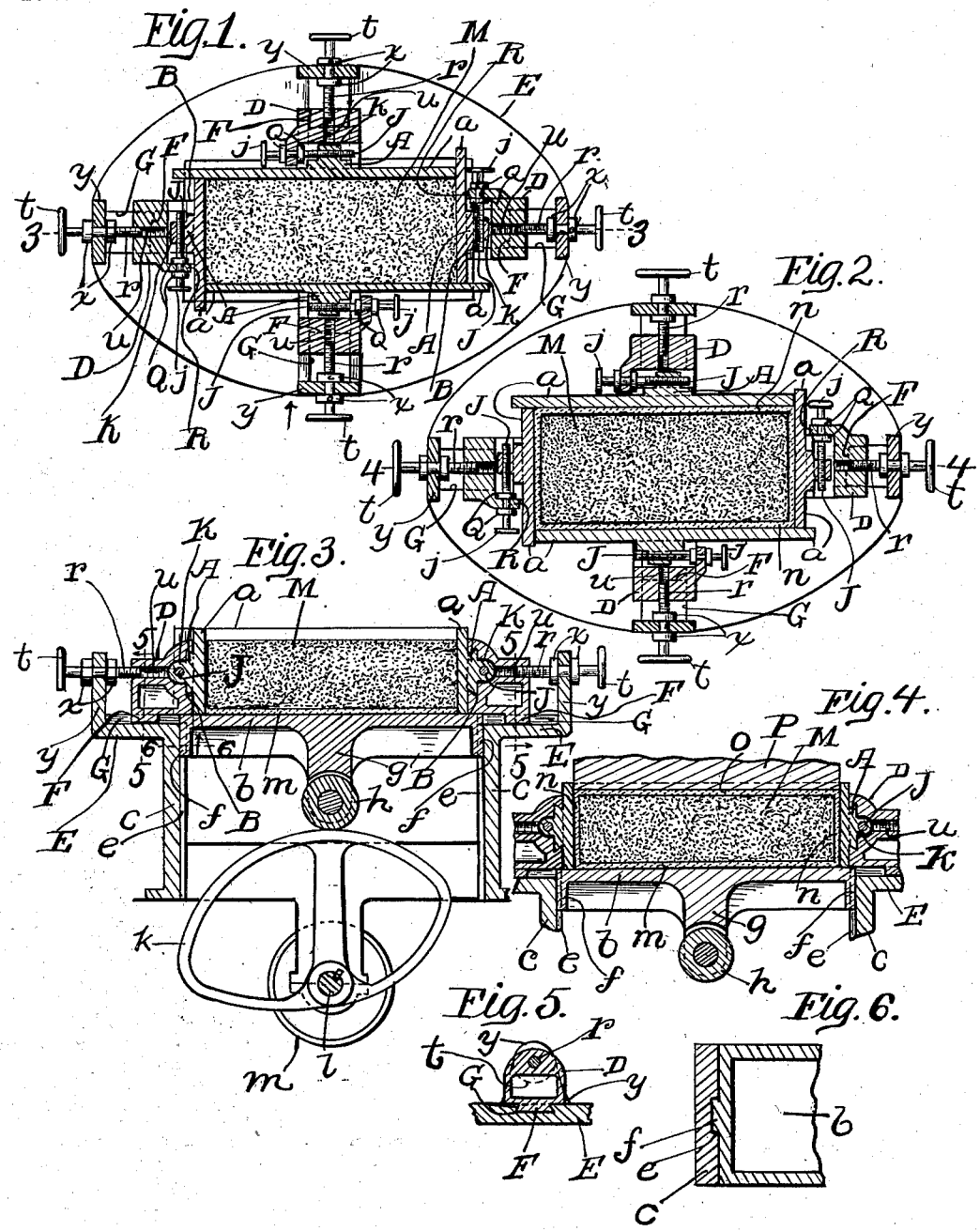

UNITED STATES PATENT OFFICE.

WILLIAM E. JAQUES, OF GRAND RAPIDS, MICHIGAN, ASSIGNOR TO ALFRED O. CROZIER, OF GRAND RAPIDS, MICHIGAN.

ART OF MAKING CEMENTITIOUS PRODUCTS OR ARTIFICIAL STONE.

SPECIFICATION forming part of Letters Patent No. 748,611, dated January 5, 1904.

Application filed March 23, 1903. Serial No. 149,161. (No specimens.)

*To all whom it may concern:*

Be it known that I, WILLIAM E. JAQUES, a citizen of the United States of America, residing at Grand Rapids, in the county of Kent and State of Michigan, have invented certain new and useful Improvements in the Art of Making Cementitious Products or Artificial Stone; and I hereby declare the following to be a full, clear, and exact description of the invention, such as will enable others skilled in the art to which it pertains to make and use the same.

This invention relates to improvements in making bricks, or blocks, or slabs, or tiles, or products in any form composed of cementitious material or artificial stone.

The primary object of this invention is to form a desirably-faced artificial stone composed of cementitious material and having an exterior surface or surfaces formed of material finer than the remaining and main portion of the product.

Another object of this invention is to form artificial stone in a mold by first covering the bottom wall or bottom of the interior chamber of the mold with a semifluid and partially non-porous facing-forming or fine cementitious composition or material in the form of a cementitious slurry containing more moisture than necessary for the setting of the said facing-forming material, then to supply the said chamber with a somewhat moist coarser and porous cementitious composition or material employed in forming the main portion or body of the product to be formed and containing less moisture and less cement or cementitious matter than required to enable an adequate setting and hardening of the said coarser material, and then to exert pressure upon the entire mass not only to compact the mass, but to force or displace moisture and cement or cementitious matter in the form of a semifluid cementitious composition into the pores of the coarser or main portion of the mass.

Another object is to partially compact the said coarser and porous portion of the said mass upon the aforesaid fine semifluid cementitious layer in a mold having endwise and laterally adjustable adjacent upright walls, then to relatively readjust the said walls to somewhat enlarge the interior chamber of the mold and form a space next exteriorly of the partially-compacted mass, then to supply the said space with a semifluid and practically non-porous facing-forming or fine cementitious composition or material in the form of a cementitious slurry containing more moisture than necessary for the setting of the said facing-forming material, and then to exert pressure upon the contents of the mold, so as to cause a spreading of the originally-compacted mass and result in forcing or running into pores of the coarser or main portion of the originally-compacted mass moisture and cement or cementitious matter displaced from the added semifluid cementitious material during the said exertion of pressure upon the contents of the mold, and thereby supply the coarser material with the moisture and cement or cementitious matter required to render the resulting and finally-compacted mass suitable for a proper setting and hardening of the product as well as for the formation of a suitably-faced product.

Another object is not only to compact the coarser and porous portion of the mass upon a semifluid and practically non-porous cementitious layer covering the bottom of the mold, but thus to partially compact the said coarser material in a mold having all of the upright walls of its interior chamber adjustable endwise and laterally, then to relatively readjust all of the said walls to enlarge the interior chamber of the mold and form a space all around and next exteriorly of the partially-compacted mass, then not only to supply the said space with a semifluid and practically non-porous facing-forming or fine cementitious composition or material in the form of a cementitious slurry containing more moisture than necessary for the setting of the said facing-forming material, but to cover the partially-compacted and enlarged mass with a layer of semifluid and practically non-porous facing-forming or fine cementitious composition or material in the form of a cementitious slurry containing more moisture than necessary for the setting of the said mass-covering layer, and then to exert pressure upon the contents of the mold, so as to cause a spreading of the originally-compacted mass and result in forcing or running into pores of the coarser and porous portion of the originally-compacted mass moisture, and cement or cementitious matter displaced from the added semifluid cementitious material during the said exertion of pressure upon the contents of the mold, so that the resulting product will be suitably faced upon all of its exterior surfaces and moisture and cement or cementitious matter will have been run or displaced into pores of the coarser and main portion of the product from every direction.

With these objects in view this invention consists in the steps or process hereinafter described, and pointed out in the claims.

In the accompanying drawings, Figures 1 and 2 are top plans, largely in section, of an adjustable mold supplied with cementitious material and suitable for use in carrying out my invention. Fig. 3 is a side elevation, largely in section, on line 3 3, Fig. 1, looking in the direction indicated by the arrow. Fig. 4 is a side elevation, largely in section, on line 4 4, Fig. 2, and shows also a portion of a plunger preferably employed in exerting the final pressure upon the contents of the mold. Fig. 5 is a vertical section on either line 5 5, Fig. 3, looking outwardly. Fig. 6 is a top plan in section on line 6 6, Fig. 3.

The mold illustrated in the drawings is quadrangular in plan and comprises, therefore, four vertically-arranged plates $a$, arranged as required to form the upright walls of the interior chamber of the mold. Adjacent plates $a$ are arranged, therefore, at right angles to each other. The bottom wall or bottom of the said chamber is formed by a horizontally-arranged table $b$, which is movable in a vertical plane and extends in under and practically into contiguity with the lower edges of the plates $a$, which, however, are slidable laterally and endwise upon the said table. The table $b$ is large enough in dimensions to extend in under all of the plates $a$ in any relative adjustment of the said plates. The table $b$ extends snugly between two guide-forming vertically-arranged and parallel walls $c$, which form a portion of the stationary framework of the machine and are provided with vertically-arranged grooves or ways $e$, engaged by correspondingly-arranged tongues $f$, formed upon the adjacent edges of the table $b$.

The table $b$ is provided at its under side and centrally with a depending arm $g$, which is provided at its lower end with a roller $h$, engaging the periphery and working surface of a cam $k$, which is operatively mounted on a suitably-supported shaft $l$, operatively provided with a wheel $m$ for turning the shaft. It will be observed, therefore, that the table $b$ is capable of lowering by gravity or elevated between the guides $c$ by turning the cam-shaft $l$ in the direction and to the extent required, and the arrangement of the parts is such that any product formed within the mold and upon the said table in the upper position of the table is lowered far enough during the next descent of the table to permit the removal of the said product from the said table and from between the guides $c$ in the lower position of the table. The table $b$ is shown in its upper position.

Each plate $a$ in order to accommodate an endwise as well as lateral adjustment of the said plate engages at one end and has the said end overlapped by the inner side of one of the adjacent plates $a$ and has its inner side a suitable distance from the said end abutting against and overlapping the adjacent end of the other adjacent plate $a$ and preferably extends beyond the outer end of the last-mentioned plate. It will be observed, therefore, that each plate $a$ is adjustable laterally outwardly from or toward the adjacent plate, which has an end overlapped by the former plate, and that each plate $a$ is adjustable endwise from or toward the inner side of the other of the adjacent plates.

Each plate $a$ is provided at its outer side with a laterally and outwardly projecting slide-forming tongue or member A, which is horizontally arranged and extends longitudinally of the said plate and engages a correspondingly-arranged slideway B, which is formed in a slide-forming block D, arranged to slide upon a stationary table E, with which the stationary framework of the machine is provided. Said slide D has a depending tongue or member F engaging a slideway G, formed in the said table E. The tongue F and engaging way E are arranged at right angles to the tongue A and engaging way B. The table E surrounds the vertically-movable table $b$.

By the construction hereinbefore described it will be observed that each plate $a$ is slidably carried by a slide D, that the said plate is adjustable endwise independently of the said slide and at right angles to the travel of the slide, and that the said plate is readjusted laterally and independently of the endwise adjustability of the plate with a readjustment of the slide by sliding the latter along the engaging slideway G.

The means employed for shifting each plate $a$ endwise independently of the slide D, which bears the said plate, comprises a screw J, which is arranged at the outer side of the said plate and parallel with the slideway B of the said plate and extends and engages with the interior screw-threads of an interiorly-screw-threaded or nut-forming ear K, which is formed upon and projects laterally and outwardly from the tongue A of the said plate, and the said screw J is prevented from endwise movement during its rotation by any suitable means—such, for instance, as two collars Q, with which the screw is provided at opposite sides, respectively, of an ear R, which is formed upon the slide D, supporting the said plate, and affords bearing to the said screw. Said screw J is provided with a hand-wheel $j$ for turning the screw.

The means employed in shifting each plate $a$ laterally comprises a screw $r$, which is arranged horizontally and at a right angle to the screw J employed in shifting the said plate endwise. Said screws J and $r$ are arranged, preferably, at the same elevation. Said screw $r$ engages a correspondingly-arranged and correspondingly screw-threaded hole $u$, formed in the upper portion of the slide D, which bears the said plate. Of course said screw $r$ and the tongue F of the said slide and the way G, engaged by the said tongue, are parallel. Said screw $r$ is prevented from shifting endwise during its rotation by any suitable means—such, for instance, as two collars $x$, with which the screw is provided at opposite sides, respectively, of an arm $y$, projecting upwardly from and rigid with the stationary framework $d$. Said screw $r$ is provided at its outer end with a hand-wheel $t$ for turning the screw.

In operating the hereinbefore-described mold and carrying out the process which constitutes the subject-matter of this application the mold-bottom-forming table $b$ is actuated into, if not already in, its upper position against the bottom edges of the plates $a$. The mold-bottom is then covered, as shown in Fig. 3, with the layer $m$ of semifluid and practically non-porous cementitious material in the form of a cementitious slurry composed, preferably, of water and hydraulic cement and containing more moisture than necessary for a setting of the cement, whereupon the said chamber is supplied, as shown in Figs. 1 and 3, with a coarser and porous and somewhat moist cementitious composition or material M, used in forming the body portion of the resulting product and comprising in its composition, measured by volume, preferably about seven parts of sand to one part of liquid cement and containing less moisture than required for a proper setting and hardening of the composition. The mass M of coarser material thus fed into the mold and constituting, as already indicated, the body portion or body of the resulting product is somewhat compacted within the mold in any approved manner to form a mass which is temporarily self-sustaining, whereupon the screws J and $r$ are manipulated as required to relatively readjust the upright walls of the interior chamber of the mold, and in Figs. 2 and 4 all of the upright walls (plates $a$) of the interior chamber of the mold are shown readjusted to enlarge the said chamber, and the space formed next exteriorly of and all round the partially-compacted mass M by the said readjustment of the said walls is supplied, as shown in Figs. 2 and 4, with semifluid and practically non-porous cementitious material $n$ in the form of a cementitious slurry containing more moisture than required for a proper setting of the cement in the said slurry, and in Fig. 4 the partially-compacted mass M is also shown covered on top with a layer $o$ of the said cementitious slurry, whereupon pressure is exerted, preferably by a plunger P, arranged to snugly fit interiorly of the mold and shown in position for operation in Fig. 4, and the pressure exerted upon or final compacting of the enlarged partially and originally compacted mass will force moisture and cement or cementitious matter from the slurry surrounding and covering or incasing the said mass into the pores of the coarser and porous body portion of the mass, so that the resulting product is suitably faced at all its exterior surfaces. By introducing the plunger P far enough into the mold moisture or semifluid cementitious matter is run or forced inwardly from the slurry incasing the porous body portion of the mass into the pores of the said body portion from all sides, top, and bottom of the mass, so as to adequately and uniformly supply the porous originally-compacted mass with water or moisture still required to render the said mass capable of setting properly, and also adequately and uniformly supply the said mass with the additional cement or cementitious matter required to render the finally compacted and enlarged mass suitable for a proper setting and hardening of the product, which is then permitted to set and harden, and the resulting product will be found to be impervious at the exterior surfaces and desirable in appearance and to possess great durability.

What I claim is—

1. An improvement in the art of making cementitious products or artificial stone, consisting in partially compacting a mass composed of a somewhat moist porous cementitious material upon a semifluid and practically non-porous cementitious layer which forms the lower exterior surface of the entire mass; then applying and confining a practically non-porous and semifluid cementitious composition or matter next to and exteriorly of other exterior surfaces of the partially-compacted mass; then exerting pressure upon the originally-compacted mass and added semifluid cementitious matter, and then permitting the product to set and harden.

2. An improvement in the art of making cementitious products or artificial stone, consisting in placing a mass composed of a somewhat moist porous cementitious material upon a semifluid cementitious layer which forms the lower exterior surface of the entire mass; then enlarging the said mass by applying and confining semifluid material next exteriorly and laterally of the original mass; then exerting pressure upon the enlarged mass, and then permitting the product to set and harden.

3. An improvement in the art of making cementitious products or artificial stone, consisting in placing a mass composed of a somewhat moist porous cementitious material upon a semifluid and practically non-porous cementitious layer and confining the entire mass; then exerting pressure upon the confined mass and thereby displacing moisture and cement or cementitious matter from the aforesaid later into pores of the superimposed porous cementitious material, and then permitting the product to set and harden.

In testimony whereof I sign the foregoing specification, in the presence of two witnesses, this 9th day of March, 1903, at Cleveland, Ohio.

WILLIAM E. JAQUES.

Witnesses:
C. H. DORER,
TELSA SCHWARTZ.